United States Patent
Chung et al.

(10) Patent No.: US 7,974,180 B2
(45) Date of Patent: Jul. 5, 2011

(54) TRANSMITTING/RECEIVING APPARATUS OF WIDEBAND WIRELESS CHANNEL APPARATUS USING MULTIPLE CARRIERS

(75) Inventors: Hyun-Kyu Chung, Daejeon (KR); Kwang-Chun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 109 days.

(21) Appl. No.: 12/096,450

(22) PCT Filed: Dec. 5, 2006

(86) PCT No.: PCT/KR2006/005196
§ 371 (c)(1),
(2), (4) Date: Jun. 6, 2008

(87) PCT Pub. No.: WO2007/066949
PCT Pub. Date: Jun. 14, 2007

(65) Prior Publication Data
US 2008/0298228 A1    Dec. 4, 2008

(30) Foreign Application Priority Data

Dec. 8, 2005  (KR) .................. 10-2005-0119874
Jul. 18, 2006  (KR) .................. 10-2006-0066849

(51) Int. Cl.
*H04J 11/00* (2006.01)
(52) U.S. Cl. .................. 370/210; 370/203; 370/208
(58) Field of Classification Search .................. 370/203, 370/206, 208, 210; 375/260, 267
See application file for complete search history.

(56) References Cited

U.S. PATENT DOCUMENTS

| | | | |
|---|---|---|---|
| 5,682,376 A | 10/1997 | Hayashino et al. | |
| 7,068,628 B2* | 6/2006 | Li et al. | 370/334 |
| 7,248,559 B2* | 7/2007 | Ma et al. | 370/208 |
| 7,254,196 B2* | 8/2007 | Kriedte et al. | 375/347 |
| 7,386,072 B2* | 6/2008 | Uno | 375/344 |
| 2003/0072452 A1* | 4/2003 | Mody et al. | 380/274 |
| 2003/0076908 A1* | 4/2003 | Huang et al. | 375/350 |
| 2004/0066740 A1* | 4/2004 | Suh et al. | 370/208 |

(Continued)

FOREIGN PATENT DOCUMENTS

DE    199 63 620    7/2001

(Continued)

OTHER PUBLICATIONS

International Search Report—PCT/KR2006/005196 dated Jun. 18, 2008.

(Continued)

*Primary Examiner* — Ricky Ngo
*Assistant Examiner* — Rasheed Gidado
(74) *Attorney, Agent, or Firm* — Kile Park Goekjian Reed & McManus PLLC

(57) ABSTRACT

The present invention relates to transmitting/receiving apparatuses of a wideband radio channel measuring device using a multi-carrier. The wideband radio channel measuring device using the multi-carrier may measure radio channel characteristics at a frequency domain. Since the radio channel is measured at the frequency domain by the wideband radio channel measuring device using the multi-carrier, the channel characteristics may be simultaneously measured while maintaining a maximum Doppler measurement frequency at a predetermined level regardless of increase of the number of transmitting and receiving antennas, in an MIMO configuration.

4 Claims, 3 Drawing Sheets

U.S. PATENT DOCUMENTS

| | | | |
|---|---|---|---|
| 2004/0116077 A1* | 6/2004 | Lee et al. | 455/101 |
| 2004/0184551 A1* | 9/2004 | Liu et al. | 375/260 |
| 2005/0111406 A1* | 5/2005 | Pasanen et al. | 370/329 |
| 2005/0185724 A1* | 8/2005 | Wang et al. | 375/260 |
| 2005/0207334 A1 | 9/2005 | Hadad | |
| 2005/0259566 A1 | 11/2005 | Chung et al. | |
| 2005/0259721 A1* | 11/2005 | Kawamoto et al. | 375/144 |
| 2006/0039272 A1* | 2/2006 | Sikri et al. | 370/208 |
| 2006/0128323 A1* | 6/2006 | Fujimoto | 455/101 |
| 2008/0212695 A1* | 9/2008 | Mo et al. | 375/260 |

FOREIGN PATENT DOCUMENTS

| | | |
|---|---|---|
| EP | 0 886 408 | 12/1998 |
| KR | 10-2003-0023525 | 3/2003 |

OTHER PUBLICATIONS

Written Opinion—PCT/KR2006/005196 dated Jun. 18, 2008.
Jarmo Kivinen et al., "Wideband Radio Channel Measurement System at 2 GHz", IEEE Transactions on Instrumentation and Measurement, vol. 48, No. 1, Feb. 1999, pp. 39-44.

* cited by examiner

[Fig. 1]
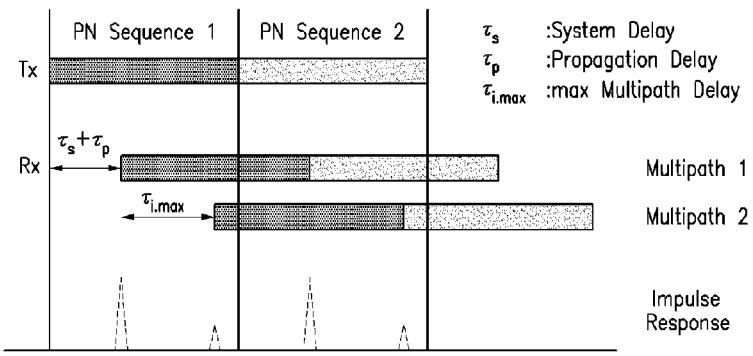
[Fig. 2]
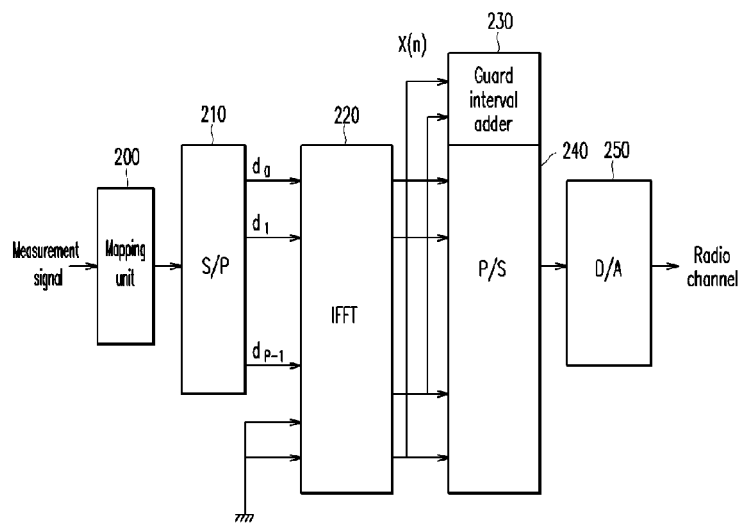
[Fig. 3]
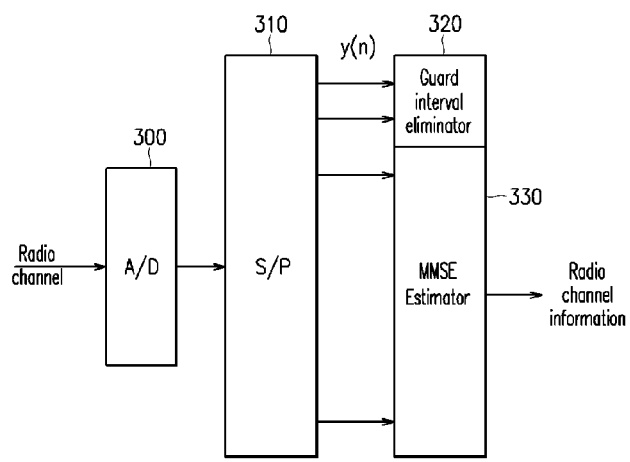

[Fig. 4]
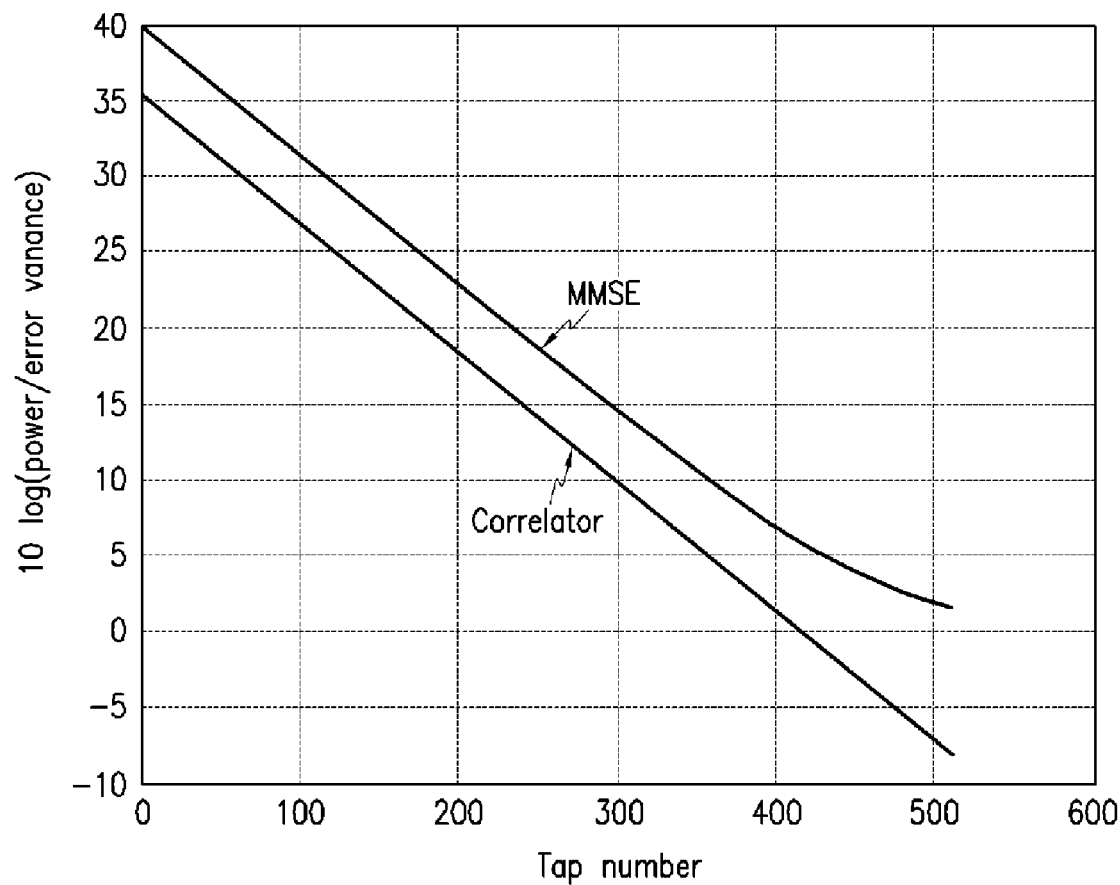
[Fig. 5]
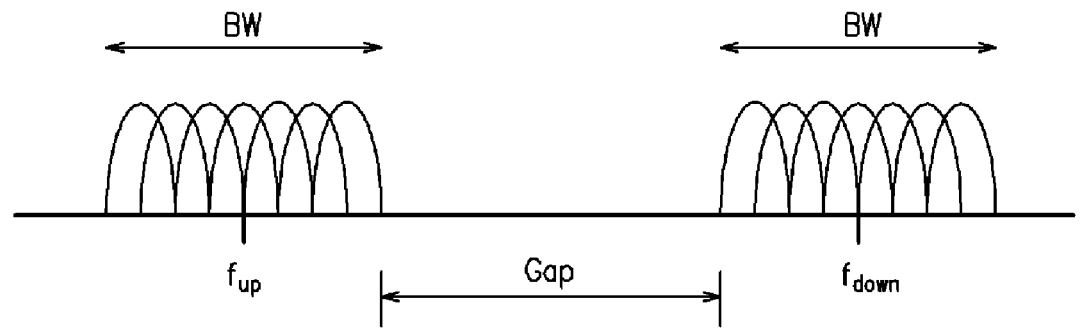

[Fig. 6]
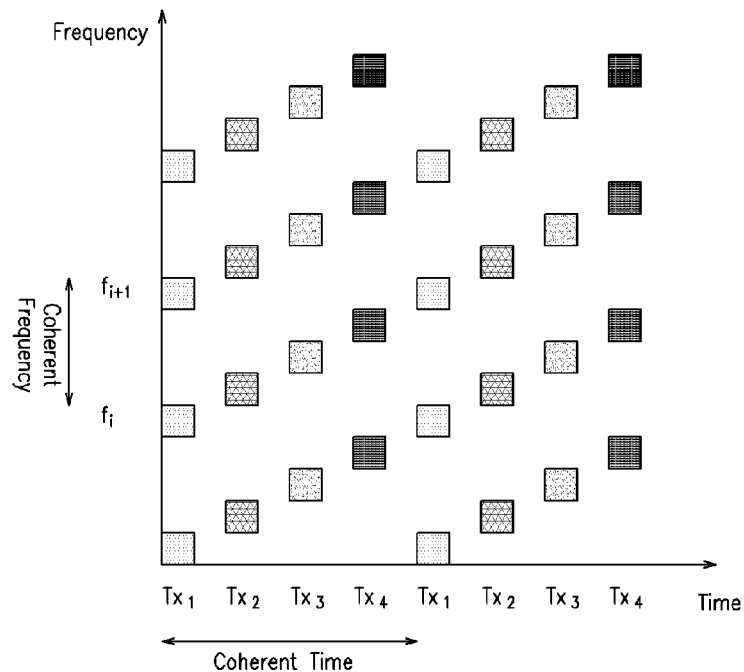
(a) Sequential transmission
[Fig. 7]
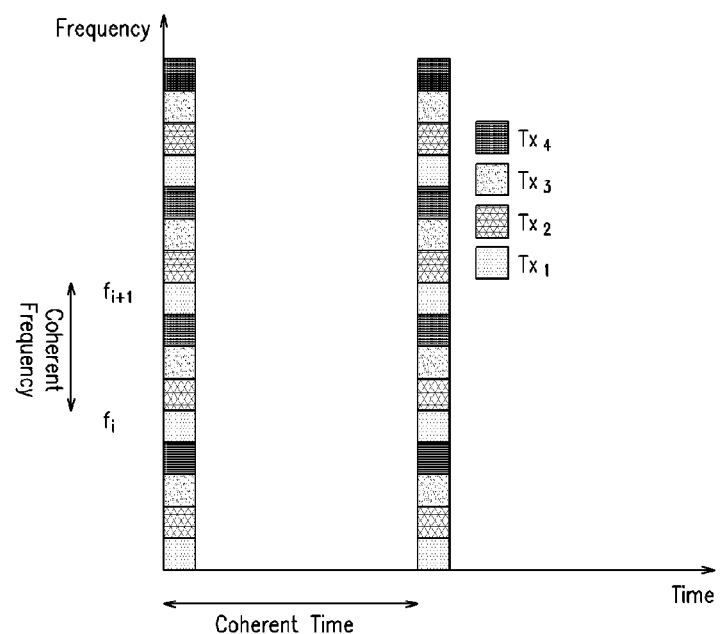
(b) Simultaneous transmission

TRANSMITTING/RECEIVING APPARATUS OF WIDEBAND WIRELESS CHANNEL APPARATUS USING MULTIPLE CARRIERS

TECHNICAL FIELD

The present invention relates to transmitting/receiving apparatuses of a wideband radio channel measuring device using a multi-carrier, and more particularly, relates to a measuring device for measuring radio channel information in an orthogonal frequency division multiplexing (OFDM) wireless communication method for transmitting data by using a plurality of subcarriers perpendicular to each other.

BACKGROUND ART

A pseudo random binary sequence (PRBS) method as shown in FIG. 1 has been conventionally used to measure a radio channel. In the PRBS method, a pseudo random code chip having a speed that is equal to that of a bandwidth to be measured is formed to transmit a transmission signal, and a receiver correlates the transmission signal and a sum of multipath waveforms corresponding to the transmission signal to obtain a frequency impulse response of a corresponding band.

Accordingly, a unit length of the pseudo random code is less than 1/W [Sec] for a measurement band having a bandwidth of W[Hz].

The unit length of the pseudo random code is required to have a short chip pulse that is inversely proportional to the bandwidth, according to a trend of the wideband mobile communication service and system.

Accordingly, complexity of realizing hardware is problematically increased to achieve accuracy in a channel measuring device of a 100 MHz bandwidth, compared to a channel measuring device of a 20 MHz bandwidth.

In a radio channel measuring method using the PRBS method, since a measurement bandwidth is determined according to a pseudo random (PN) chip rate, it is difficult to change the measurement bandwidth and it is difficult to concurrently measure the radio channel in a dual frequency band having the divided measurement band.

When the PRBS method is applied to a multi input multi output (MIMO) channel, a maximum Doppler measurement range is problematically reduced in a time division method as the number of antennas is increased.

Since it is assumed in the radio channel measuring method using the PRBS method in which the radio channel is not changed during a measuring period, an error may occur in a time-varying channel.

That is, the PRBS method is difficult to be realized, and it is difficult to measure an impact response characteristic of the radio channel in a bandwidth variation configuration.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide transmitting/receiving apparatuses of a wideband radio channel measuring device for measuring radio channel characteristics at a frequency domain by using multi-carriers.

Technical Solution

An exemplary transmitter of a wideband radio channel measuring device transmitting radio channel information in an orthogonal frequency division multiplexing radio channel measuring system includes a serial/parallel converter, an inverse fast Fourier transform unit, a guard interval adder, and a parallel/serial converter. The serial/parallel converter converts a measurement signal into a discrete parallel signal. The inverse fast Fourier transform unit transforms the converted parallel signal into a transmission signal modulated by using a multi-carrier on a measurement bandwidth. The guard interval adder adds a guard interval to the transformed transmission signal. The parallel/serial converter converts the transmission signal having the guard interval into a serial signal at a time domain, and externally transmits it through a transmission antenna.

An exemplary receiver of the wideband radio channel measuring device transmitting radio channel information in an orthogonal frequency division multiplexing radio channel measuring system includes an analog/digital converter, a serial/parallel converter, a guard interval eliminator, and a minimum mean square error estimator. The analog/digital converter receives a transmission signal from a transmitter for modulating a measurement signal by using a multi-carrier and transmitting the measurement signal as the transmission signal, and converts the transmission signal into a digital signal. The serial/parallel converter converts the converted digital signal into a discrete parallel signal, and generates a received signal having a radio channel impact response. The guard interval eliminator eliminates a guard interval from the received signal. The minimum mean square error estimator allocates a minimum mean square error algorithm to the received signal having no guard interval to estimate a channel at a frequency domain rather than estimating the channel at a time domain, and outputs the radio channel information of the received signal.

ADVANTAGEOUS EFFECTS

According to the exemplary embodiment of the present invention, since the radio channel is measured at the frequency domain, the measurement frequency bandwidth may be freely increased or reduced.

Since the radio channel is measured at the frequency domain in the exemplary embodiment of the present invention, channel characteristics at different bands (that is, at the dual-band in which the measurement band is divided) may be simultaneously measured in the SISO configuration.

In addition, since the radio channel is measured at the frequency domain in the exemplary embodiment of the present invention, the channel characteristics may be simultaneously measured while maintaining a maximum Doppler measurement frequency at a predetermined level regardless of the increase of the number of the transmitting and receiving antennas, in the MIMO configuration.

Further, in the time-varying channel environment during the measurement period, an excellent channel measurement configuration may be realized compared to the PRBS method.

BRIEF DESCRIPTION OF THE DRAWINGS

FIG. 1 shows a diagram representing a radio channel measuring method using a conventional pseudo random binary sequence (PRBS) method.

FIG. 2 shows a block diagram of an internal configuration of a transmitter of a wideband radio channel measuring device using a multi-carrier according to an exemplary embodiment of the present invention.

FIG. 3 shows a block diagram of an internal configuration of a receiver of the wideband radio channel measuring device using the multi-carrier according to the exemplary embodiment of the present invention.

FIG. 4 shows a simulation result for comparing receiving performance according to a Doppler frequency at a time-varying channel.

FIG. 5 shows a dual-band channel measuring method for simultaneously measuring a dual-band channel in a single transmitting/receiving antenna configuration according to the exemplary embodiment of the present invention.

FIG. 6 shows a diagram representing multi-carriers sequentially transmitted for respective transmitting antennas in multiple transmitting/receiving antennas according to the exemplary embodiment of the present invention.

FIG. 7 shows a diagram representing multi-carriers simultaneously transmitting for the respective transmitting antennas in the multiple transmitting/receiving antennas according to the exemplary embodiment of the present invention.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprise", and variations such as "comprises" or "comprising", will be understood to imply the inclusion of stated elements but not the exclusion of any other elements.

A transmitter and a receiver of a wideband radio channel measuring device using a multi-carrier according to an exemplary embodiment of the present invention will now be described with reference to the figures.

In the exemplary embodiment of the present invention, a device for measuring a channel in a frequency domain by using the multi-carrier or an orthogonal multi-carrier will be described.

Firstly, a configuration of the transmitter of the wideband radio channel measuring device using the multi-carrier according to the exemplary embodiment of the present invention will be described.

FIG. 2 shows a block diagram of an internal configuration of the transmitter of the wideband radio channel measuring device using the multi-carrier according to the exemplary embodiment of the present invention.

It will be assumed that the transmitter using the multi-carrier is the radio channel measuring device using the orthogonal multi-carrier, for convenience of description.

The transmitter according to the exemplary embodiment of the present invention a mapping unit 200, a serial/parallel converter 210, an inverse fast Fourier transform unit 220, a guard interval adder 230, a parallel/serial converter 240, and a digital/analog converter 250.

The mapping unit 200 transforms input data into frequency domain symbol data by using a modulation method used in an orthogonal frequency division multiplexing subchannel, and allocates the transformed symbol data to a predetermined subchannel.

The mapping unit 200 detects a carrier frequency error or a sampling frequency error to compensate the detected error, or allocates a pilot signal to the subchannel to estimate a channel quality.

The mapping unit 200 transmits the transformed symbol data and the pilot signal to the serial/parallel converter 210. The serial/parallel converter 210 converts the signal received from the mapping unit 200 into a discrete parallel signal, and transmits the parallel signal to the inverse fast Fourier transform unit 220.

The inverse fast Fourier transform unit 220 transforms the data and pilot signal received from the serial/parallel converter 210 into a time domain transmission signal, and transmits it to the guard interval adder 230.

Here, the transmission signal is formed by modulating the received data and pilot signal by using the orthogonal multi-carrier through the measurement bandwidth.

The transmission signal X(n) is given as Math FIG. 1.

$$x(n) = \sqrt{\frac{Es}{N}} \sum_{k=0}^{P-1} d_k e^{j2\pi k/N}, \ -L \le n \le N-1 \qquad \text{MathFigure 1}$$

Here, Es denotes an orthogonal frequency division multiplexing (OFDM) symbol energy, N denotes a size of fast Fourier transform (FFT), P denotes the number of active subcarriers, and L denotes a length of a guard interval.

The guard interval adder 230 adds the guard interval to the transmission signal received from the inverse fast Fourier transform unit 220 to prepare a delay spread that causes performance deterioration in a wireless channel environment.

The parallel/serial converter 240 converts the transmission signal received from the guard interval adder 230 into a serial signal in a time domain to transmit the converted serial signal to the digital/analog converter 250.

The digital/analog converter 250 converts a digital signal into an analog signal to generate the analog signal to be transmitted through an antenna.

As described above, the transmitter according to the exemplary embodiment of the present invention uses the multi-carrier or the orthogonal multi-carrier to modulate the measurement signal corresponding to the bandwidth for measuring a channel at a frequency domain rather than a time domain, and transmits the modulated signal.

A configuration of the receiver of the wideband radio channel measuring device using the multi-carrier according to the exemplary embodiment of the present invention will now be described.

FIG. 3 shows a block diagram of an internal configuration of the receiver of the wideband radio channel measuring device using the multi-carrier according to the exemplary embodiment of the present invention.

It will be assumed that the receiver using the multi-carrier is the radio channel measuring device using the orthogonal multi-carrier, for convenience of description.

The receiver according to the exemplary embodiment of the present invention includes an analog/digital converter 300, a serial/parallel converter 310, a guard interval eliminator 320, and an MMSE estimator 330.

When receiving an analog signal (a received signal) from the transmitter through an antenna, the analog/digital converter 300 converts the received analog signal into a digital signal, and transmits the converted digital signal to the serial/parallel converter 310.

The serial/parallel converter 310 converts the digital signal into a discrete parallel signal, and transmits the parallel signal to the guard interval eliminator 320.

The guard interval eliminator 320 eliminates a guard interval from the parallel signal received from the serial/parallel converter 310, and transmits it to a minimum mean square error (MMSE) channel estimator.

The received signal Y (n) may be given as Math FIG. 2 or Math FIG. 3.

$$y(n) = \sum_{k=0}^{L-1} h(n,k) x*(n-k) + w(n) \quad \text{MathFigure 2}$$

$$y(n) = x*(n)h(n) + w(n) \quad \text{MathFigure 3}$$

$$x(n) = \begin{bmatrix} x(n) \\ x(n-1) \\ x(n-2) \\ \vdots \\ x(n-L+1) \end{bmatrix}$$

$$h(n) = \begin{bmatrix} h(n,0) \\ h(n,1) \\ h(n,2) \\ \vdots \\ h(n,L-1) \end{bmatrix}$$

$$y = \begin{bmatrix} y(0) \\ y(1) \\ y(2) \\ \vdots \\ y(N-1) \end{bmatrix}$$

Here, n denotes a time parameter, k denotes a multipath delay, w(n) denotes a white Gaussian noise, X(n) denotes a transmission signal, and h(n,k) denotes a single input single output time-varying radio channel impact response.

At a predetermined time for estimating a channel when n=n0, a linear MMSE radio channel impact response $$\hat{h}(h_0)$$

is given as Math FIG. 4. Here, M is calculated by using an orthogonality principle.

$$E\{(h(n_0)-\hat{h}(n_0))y^*\}=0$$

$$E\{(h(n_0)-My)y^*)\}=0$$

$$E\{(h(n_0)y^*\}-ME\{yy^*\}=0$$

$$M=E\{h(n_0)y^*\}[E\{yy^*\}]^{-1}$$

$$\hat{h}(n_0)=My=E\{h(n_0)y^*\}[E\{yy^*\}]^{-1}y=R_{hy}R_{yy}^{-1}y \quad \text{MathFigure 4}$$

The MMSE channel estimator 330 allocates a minimum mean square error algorithm to the received signal having no guard interval to estimate the channel, generates radio channel information, and outputs it.

The minimum mean square error algorithm has been disclosed in the prior art, and therefore a detailed description thereof will be omitted.

In a time-varying channel environment during a symbol period, the receiver according to the exemplary embodiment of the present invention provides excellent channel measurement characteristics compared to a conventional pseudo-random (PN) corrector method.

FIG. 4 shows a simulation result for comparing receiving performance according to a Doppler frequency fd at the time-varying channel. The result shows that the linear MMSE receiving method according to the exemplary embodiment of the present invention achieves greater performance compared to the conventional PRBS method, when the time-varying characteristic is provided during the symbol period of the measurement signal.

The above linear MMSE receiving method corresponds to a single input single output configuration of a single transmitting/receiving antenna.

In the exemplary embodiment of the present invention, the radio channel is measured at the frequency domain by using the multi-carrier or the orthogonal multi-carrier. That is, a baseband signal corresponding to the measurement bandwidth is modulated by using the multi-carrier or the orthogonal multi-carrier, and is transmitted.

In the linear MMSE receiving method of the single input/output configuration shown in FIG. 2 or FIG. 3, dual-band channel characteristics having the divided measurement channel as shown in FIG. 5 may be simultaneously measured.

That is, in the MMSE receiving method of the single input single output configuration, subcarriers are disposed on locations corresponding to bidirectional measurement bandwidth based on the entire bandwidth to simultaneously measure the channel in the dual-band.

When the method for measuring the radio channel by using the multi-carrier or the orthogonal multi-carrier is applied to the multiple input multiple output configuration, the multi-carrier is disposed for each transmitting antenna as shown in FIG. 6 or FIG. 7, and therefore multiple channels may be simultaneously measured at the same transmitting/receiving band.

In a method for disposing the multi-carrier, the multi-carrier is sequentially or simultaneously transmitted according to a demand for a power amplifier of the transmitter. When it is sequentially transmitted, it is required to finish transmission processes of all the transmitting antennas during a coherent time.

When the linear MMSE receiving method is applied to the multiple input multiple output configuration, the subcarriers are disposed for each transmitting antenna as shown in FIG. 6 or FIG. 7, and N×M radio channels may be simultaneously estimated. Here, N and M respectively denote the number of transmitting and receiving antennas.

The linear MMSE receiving method of the multiple input multiple output configuration has a merit in that a gap between the subcarriers disposed in the transmitting antenna may be formed in a coherence bandwidth. In addition, when the disposition of the subcarriers for each antenna is determined, a process for measuring the radio channel information is the same as that of the single input single output configuration.

When the PRBS method is sequentially used for each transmitting antenna, a Doppler measuring range is inversely proportional to the increase of the number of the transmitting antennas. However, when the OFDM method is sequentially used for each transmitting antenna, the Doppler measuring range is fixed regardless of the number of transmitting antennas.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmitter of a wideband radio channel measuring device for transmitting radio channel information in an orthogonal frequency division multiplexing radio channel measuring system, the transmitter comprising:
   a serial/parallel converter for converting a measurement signal into a discrete parallel signal;
   an inverse fast Fourier transform unit for transforming the converted parallel signal into a transmission signal modulated by using a multi-carrier on a measurement bandwidth;
   a guard interval adder for adding a guard interval to the transformed transmission signal; and
   a parallel/serial converter for converting the transmission signal having the guard interval into a serial signal in a time domain, and externally transmitting it through a transmission antenna, wherein the transmission signal X(n) is given as $$x(n) = \sqrt{\frac{Es}{N}} \sum_{k=0}^{P-1} d_k e^{j2\pi k/N}, \quad -L \le n \le N-1$$

(here, Es denotes an orthogonal frequency division multiplexing symbol energy, N denotes a size of fast Fourier transform (FFT), P denotes the number of active subcarriers, $d_k$ denotes the received data or pilot signal, and L denotes a length of the guard interval.

2. A receiver of a wideband radio channel measuring device for transmitting radio channel information in an orthogonal frequency division multiplexing radio channel measuring system, the receiver comprising:
   an analog/digital converter for receiving a transmission signal from a transmitter for modulating a measurement signal by using a multi-carrier and transmitting the measurement signal as the transmission signal, and converting the transmission signal into a digital signal;
   a serial/parallel converter for converting the converted digital signal into a discrete parallel signal, and generating a received signal having a radio channel impact response;
   a guard interval eliminator for eliminating a guard interval from the received signal; and
   a minimum mean square error estimator for applying a minimum mean square error algorithm to the received signal having no guard interval to estimate a channel in a frequency domain rather than estimating the channel in a time domain, and outputting the radio channel information of the received signal,
   wherein the radio channel impact response is obtained by multiplying $$y(n) = \sum_{k=0}^{L-1} h(n,k)x*(n-k) + w(n)$$

or y(n)=x*(n)h(n)+w(n) by E:h($n_0$)y*:[E:yy*:]$^{-1}$ (here, n denotes a time parameter, k denotes a multipath delay variable, W(n) denotes white Gaussian noise, and h(n,k) denotes a time-varying radio channel impact response in a single input single output configuration).

3. A receiver of a wideband radio channel measuring device for transmitting radio channel information in an orthogonal frequency division multiplexing radio channel measuring system, the receiver comprising:
   an analog/digital converter for receiving a transmission signal from a transmitter for modulating a measurement signal by using a multi-carrier and transmitting the measurement signal as the transmission signal, and converting the transmission signal into a digital signal;
   a serial/parallel converter for converting the converted digital signal into a discrete parallel signal, and generating a received signal having a radio channel impact response;
   a guard interval eliminator for eliminating a guard interval from the received signal; and
   a minimum mean square error estimator for applying a minimum mean square error algorithm to the received signal having no guard interval to estimate a channel in a frequency domain rather than estimating the channel in a time domain, and outputting the radio channel information of the received signal,
   wherein channel characteristics of a dual-band having divided measurement bands are simultaneously measured when the receiver is applied to a single input single output configuration of a single transmitting/receiving antenna.

4. A receiver of a wideband radio channel measuring device for transmitting radio channel information in an orthogonal frequency division multiplexing radio channel measuring system, the receiver comprising:
   an analog/digital converter for receiving a transmission signal from a transmitter for modulating a measurement signal by using a multi-carrier and transmitting the measurement signal as the transmission signal, and converting the transmission signal into a digital signal;
   a serial/parallel converter for converting the converted digital signal into a discrete parallel signal, and generating a received signal having a radio channel impact response;
   a guard interval eliminator for eliminating a guard interval from the received signal; and
   a minimum mean square error estimator for applying a minimum mean square error algorithm to the received signal having no guard interval to estimate a channel in a frequency domain rather than estimating the channel in a time domain, and outputting the radio channel information of the received signal,
   wherein a multiple channel at the same transmitting/receiving band is simultaneously measured when a multi-input multi-output configuration is applied to the receiver and the multi-carrier is sequentially or simultaneously disposed for each transmitting antenna.

* * * * *